Figures 1, 2, 3:
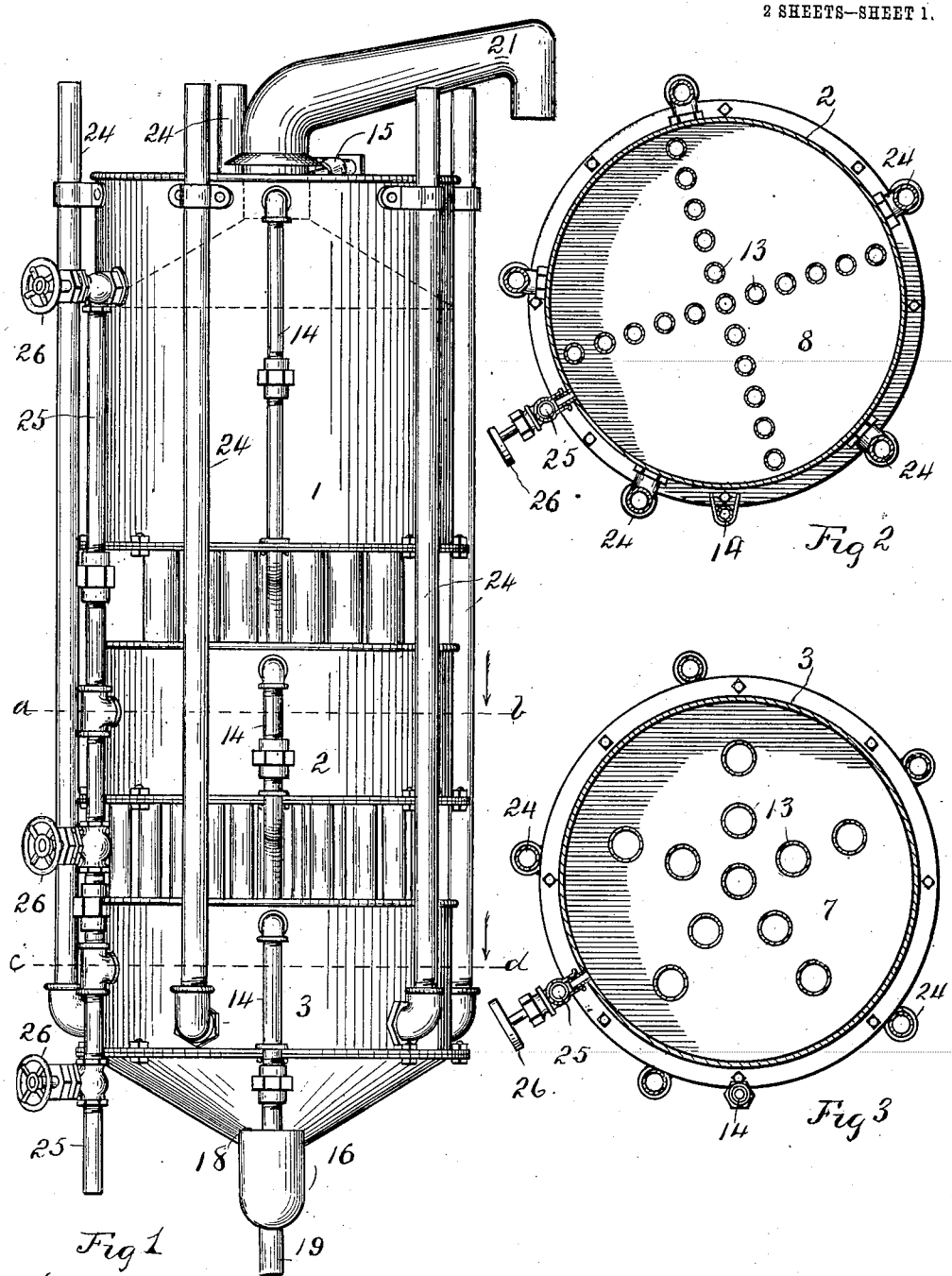

No. 824,880. PATENTED JULY 3, 1906.
W. McINTYRE.
CONDENSER AND WATER PURIFIER.
APPLICATION FILED SEPT. 21, 1905.

2 SHEETS—SHEET 1.

Witnesses:
R. E. Hamilton
H. W. House.

Inventor
William McIntyre
By Warren D. House
His Attorney

No. 824,880. PATENTED JULY 3, 1906.
W. McINTYRE.
CONDENSER AND WATER PURIFIER.
APPLICATION FILED SEPT. 21, 1905.

2 SHEETS—SHEET 2.

Witnesses:
R. E. Hamilton
H. W. House

Inventor,
William McIntyre
By Warren D. House
His Attorney.

UNITED STATES PATENT OFFICE.

WILLIAM McINTYRE, OF KANSAS CITY, MISSOURI, ASSIGNOR OF ONE-HALF TO WILLIAM T. CLEARY, OF ST. LOUIS, MISSOURI.

CONDENSER AND WATER-PURIFIER.

No. 824,880. Specification of Letters Patent. Patented July 3, 1906.

Application filed September 21, 1905. Serial No. 279,436.

*To all whom it may concern:*

Be it known that I, WILLIAM McINTYRE, a citizen of the United States, residing at Kansas City, in the county of Jackson and State of Missouri, have invented new and useful Improvements in a Combination Condenser and Water-Purifier, of which the following is a specification.

My invention relates to improvements in combination condensers and water-purifiers.

The object of my invention is to provide a device by which the water supplied to a steam-boiler may be thoroughly purified.

My invention provides a condenser for condensing the exhaust-steam from an engine, combined with means for purifying the water to be used in the boiler, the purified water and condensed steam being delivered to a single pipe adapted to be connected with a reservoir from which the boiler receives its water-supply.

My invention provides a series of condensing-chambers disposed one above the other and connected in series by steam-pipes, the upper chamber having an inlet for receiving the exhaust-steam and the lower chamber having an outlet for air and water, a series of settling-basins mounted one upon each condensing-chamber, each settling-basin having an overflow-pipe, the upper overflow-pipes discharging, respectively, into the basins next below and the lower overflow-pipe discharging into the outlet of the lower chamber.

My invention provides, further, one or more upwardly-extending air-draft pipes connected at their lower ends to the lower chamber for assisting in causing a rapid downward movement through the chambers of the exhaust-steam.

My invention provides, further, means by which the settling-basins may be respectively drained.

Another feature of my invention is the providing of one or more screens in the upper condensing-chamber for thoroughly diffusing the exhaust-steam entering therein, thus facilitating its condensation.

Another feature of my invention is in the radial disposition of the steam-pipes connecting the condensing-chambers, whereby access to all parts of the settling-basins may be freely obtained.

A further novel feature of my invention resides in the employment of a flaring pipe for receiving the exhaust-steam from the engine, the larger end of the pipe being connected to the inlet of the upper condensing-chamber, thus affording a free expansion of the incoming steam.

Other novel features are hereinafter fully described and claimed.

Figure 5:
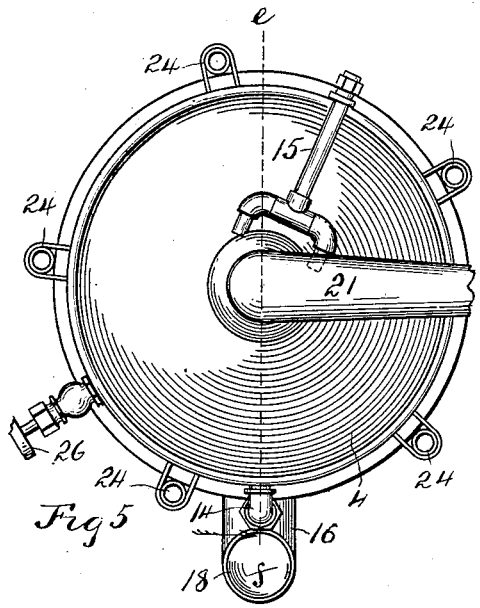
Figure 6:
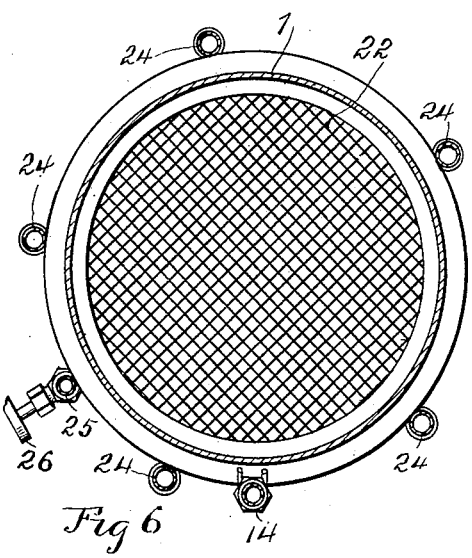
Figure 4:
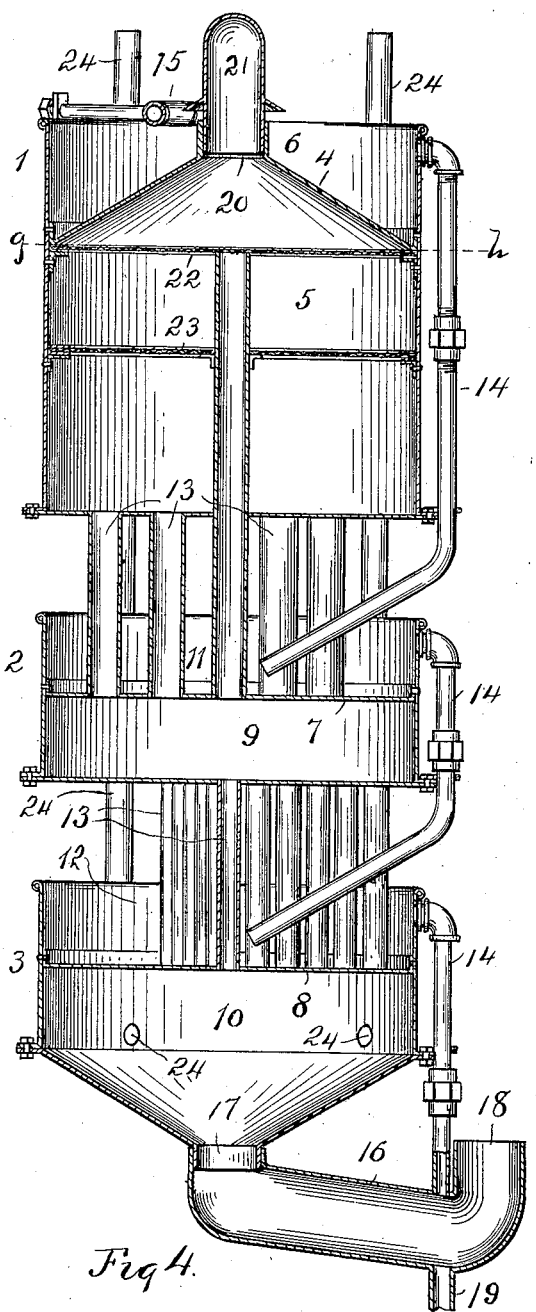

In the accompanying drawings, Figure 1 is a side elevation view of my improved condenser and purifier. Fig. 2 is a cross-section taken on the dotted line $a\,b$ of Fig. 1. Fig. 3 is a cross-section taken on the dotted line $c\,d$ of Fig. 1. Fig. 4 is a vertical sectional view taken on the dotted line $e\,f$ of Fig. 5. Fig. 5 is a top view of the condenser and purifier. Fig. 6 is a cross-section taken on the dotted line $g\,h$ of Fig. 4.

Similar characters of reference denote similar parts.

1, 2, and 3 denote, respectively, three vertical tubular casings, each open at its upper end and each closed at its lower end. The casing 1 is provided with a transverse conical partition 4, transversely dividing the casing and forming below it a condensing-chamber 5 and forming in the casing above the partition 4 a settling-basin 6. The casings 2 and 3 are respectively divided transversely by two horizontal partitions 7 and 8, forming below said partitions condensing-chambers 9 and 10, respectively, and forming above said partitions, respectively, the settling-basins 11 and 12. A plurality of vertical radially-disposed steam-pipes 13 connect, respectively, the condensing-chambers 5 and 9 and 9 and 10. The steam-pipes 13 are disposed in radial rows, so as to enable easy access to the basins 11 and 12 for the purpose of removing material deposited therein. A series of overflow-pipes 14 are connected, respectively, at their upper ends to the casings 1, 2, and 3 at points adjacent the upper ends of the basins 6, 11, and 12. Water is supplied into the upper basin 6 by means of a tubular conductor 15, connected with any source of water-supply. The two upper overflow-pipes 14 discharge, respectively, into the basins 11 and 12. The lower overflow-pipe 14 discharges into an outlet-pipe 16, one end of which is connected to a central outlet 17 in the lower end of the chamber 10, the other end of the pipe 16 having an upwardly-turned open end 18 for the discharge of air and a discharge-pipe 19 connected to its lower side. The pipe 19 may be caused to empty into a reservoir (not shown) from which the boiler (not shown) receives its water-supply.

The partition 4 is provided with a central inlet-opening 20, to which is connected the larger end of a flaring pipe 21, the smaller end of which may be connected in any suitable manner with the exhaust-port of the engine. Two horizontal transverse screens 22 and 23 are disposed one above the other in the chamber 5 and serve to diffuse the exhaust-steam entering the condensing-chamber. One or more upwardly-extending air-draft pipes 24 are connected at their lower ends to the chamber 10 and serve by their natural draft to permit the ready passage from said chamber of the air contained therein, thus permitting free expansion of the steam. The basins 6, 11, and 12 are each connected adjacent their lower ends with a vertical conductor 25, provided with a series of shut-off valves 26, disposed, respectively, so as to normally prevent the discharge of water from said basins through the conductor 25. By opening the valves 26 the several basins may be drained.

My invention is operated as follows: The exhaust-steam from the engine (not shown) is admitted through the pipe 21 and passes into the chamber 5, in which it is diffused by the screens 22 and 23, after which it passes from said chamber through the upper steam-pipes 13 into the chamber 9, thence through the lower pipes 13 into the chamber 10, in which chamber final condensation takes place, the water formed from the condensed steam passing downward through the outlet 17, outlet-pipe 16, into the tube 19, which conveys it to any suitable reservoir by which the water is supplied to the boiler. Air carried with the steam passes partly through the pipes 24 and partly through the pipe 16 and outward through the outlet 18. Water admitted from the pipe 15 to the basin 6 will fill said basin to a level corresponding to the upper end of the pipe 14, through which the overflow will pass into the basin 11 and thence by the pipe 14, connected thereto, into the basin 12, from which the overflow will pass by means of the lower pipe 14 into the pipe 16, from which, with the condensed steam, it will pass into the tube 19, to be carried to the reservoir (not shown) from which the boiler receives its supply of water. The water passing into and from the basins 6, 11, and 12 will by settling deposit silt, mud, and similar material mechanically suspended in the water in the basins, the deposition of such material being aided greatly by the heating effect caused by proximity to the condensing-chambers 5, 9, and 10 and the steam-pipes 13. Only so much water is admitted into the basins as is required with the water obtained by condensation of the steam from the boiler to keep the boiler supplied with the water used to make steam in the boiler. All the water passing from the pipe or tube 19 will be purified, thus avoiding incrustation in the boiler due to impure water.

Owing to its construction the condenser will condense the steam without water in the settling-basins; but with the use of the basins containing running water the condensation of the steam is materially assisted.

My invention may be modified in many ways without departing from its spirit.

Having thus described my invention, what I claim, and desire to secure by Letters Patent, is—

1. The combination with a plurality of condensing-chambers disposed one above the other and connected by pipes for the passage of steam, the upper chamber having an inlet to receive the exhaust-steam and the lower chamber having an outlet for water and air, of a plurality of settling-basins mounted one upon each of said chambers and encircling said steam-pipes, the upper basins having overflow-pipes discharging respectively into the next lower basins, the lowest basin having an overflow-pipe discharging into the outlet of the lower chamber.

2. In a combined condenser and water-purifier, the combination with a plurality of condensing-chambers disposed one above the other and connected respectively by steam-pipes, the upper chamber having an inlet to receive the exhaust-steam and the lower chamber having an outlet for air and water, of a series of settling-basins mounted one on each chamber, a series of overflow-pipes connected one to each basin, the lowest overflow-pipe discharging into the outlet of the lower chamber and the other overflow-pipes discharging each into the next lower basin, and means for diffusing the steam entering the upper chamber.

3. In a combined condenser and water-purifier, the combination with a plurality of condensing-chambers disposed one above the other, adjacent chambers being connected by steam-pipes, the upper chamber having an inlet for the steam to be condensed, and the lower chamber having an outlet for air and water, of a screen disposed transversely in the upper chamber, a plurality of settling-basins mounted one on each chamber, and a series of overflow-pipes connected respectively with said basins and the upper overflow-pipes discharging respectively into the basins next below, the lowest overflow-pipe discharging into the outlet of the lower chamber.

4. In a combined condenser and water-purifier, the combination with a plurality of condensing-chambers disposed one above the other, the upper chamber having an inlet for receiving the exhaust-steam, and the lower chamber having an outlet for water and air, of a plurality of sets of vertical radially-disposed pipes connecting respectively the different chambers, a plurality of settling-basins mounted one on each chamber, and a plurality of overflow-pipes connected respectively one to each basin, the upper overflow-pipes discharging each into the next lower basin, and the lowest overflow-pipe discharging into the outlet of the lower chamber.

5. A combined condenser and water-purifier comprising a series of condensing-chambers disposed one above the other, steam-pipes connecting said chambers, the upper chamber having an inlet for receiving the exhaust-steam, the lower chamber having an outlet for air and water, one or more upwardly-extending draft-pipes connected at their lower ends to the lower chamber, a plurality of basins mounted one on each chamber, means in the upper chamber for diffusing the steam, overflow-pipes connected one to each basin, the upper overflow-pipes discharging each into the next lower basin, the lower overflow-pipe discharging into the outlet for the lower chamber, means for supplying water to the upper basin, and means by which the basins may be drained respectively of water contained therein.

6. A combined condenser and water-purifier comprising a series of condensing-chambers connected in series one above the other by steam-pipes, the upper chamber having an inlet for steam, the lower chamber having an outlet for air and water, one or more screens disposed transversely and horizontally in the upper chamber, a plurality of settling-basins mounted one on each chamber, overflow-pipes connected one to each basin, the upper overflow-pipes discharging each into the next lower basin, the lower overflow-pipe discharging into the outlet of the lower chamber, means for supplying water to the upper basin, means respectively for draining the several basins, and upwardly-extending draft-pipes connected at their lower ends to the lower chamber.

7. A combined condenser and water-purifier comprising a plurality of condensing-chambers disposed one above the other, the upper chamber having an inlet for exhaust-steam, the lower chamber having an outlet for water and air, steam-pipes connecting respectively the different chambers, a plurality of settling-basins mounted one on each chamber, means by which water may be supplied to the upper basin, overflow-pipes connected to said basins respectively, the upper overflow-pipes discharging into the next lower basins respectively, the lower overflow-pipe discharging into the outlet of the lower chamber, and a flaring steam-pipe connected at its larger end to the inlet of the upper chamber.

8. A combined condenser and water-purifier comprising a plurality of condensing-chambers disposed one above the other, the upper chamber having an inlet for exhaust-steam, the lower chamber having an outlet, an outlet-pipe connected to said outlet and having two outlets one disposed above the other for the passage of water and air respectively, a plurality of steam-pipes connecting respectively the said chambers, a plurality of basins mounted one on each chamber, a plurality of overflow-pipes connected one to each basin, the upper overflow-pipes discharging each into the next lower basin, the lower overflow-pipe discharging into said outlet-pipe, means for supplying water to the upper basin, and an upwardly-extending air-draft pipe connected at its lower end to the lower chamber.

9. A combined condenser and water-purifier comprising a plurality of condenser-chambers disposed one above the other the upper chamber having an inlet for exhaust-steam, the lower chamber having an outlet for water and air, a plurality of steam-pipes connecting respectively the chambers, a horizontal transverse screen in the upper chamber, an air-draft pipe connected at its lower end to the lower chamber and extending upwardly therefrom, a plurality of settling-basins mounted one on each chamber, a plurality of overflow-pipes connected one to each basin, the upper overflow-pipes discharging into the basins next below respectively, the lower overflow-pipe discharging into the outlet of the lower chamber, means for supplying water to the upper basin, means by which the basins may be respectively drained, and a flaring-pipe connected at its larger end to the inlet of the upper chamber and adapted to receive in its smaller end the exhaust-steam.

In testimony whereof I affix my signature in presence of two subscribing witnesses.

WILLIAM McINTYRE.

Witnesses:
 WARREN D. HOUSE,
 HENRY F. ROSE.